(12) United States Patent
Alam et al.

(10) Patent No.: US 9,762,470 B2
(45) Date of Patent: Sep. 12, 2017

(54) DETERMINING PERFORMANCE CRITERIA OF A VEHICLE COMMUNICATION NETWORK CONNECTION

(71) Applicant: GM Global Technology Operations LLC, Detroit, MI (US)

(72) Inventors: Muhammad F. Alam, Macomb, MI (US); William R. Price, Grand Blanc, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 14/686,033

(22) Filed: Apr. 14, 2015

(65) Prior Publication Data
US 2016/0308743 A1 Oct. 20, 2016

(51) Int. Cl.
| | | |
|---|---|---|
| G06F 7/00 | (2006.01) | |
| H04L 1/00 | (2006.01) | |
| B60R 25/10 | (2013.01) | |
| H04L 12/26 | (2006.01) | |
| H04W 4/00 | (2009.01) | |

(52) U.S. Cl.
CPC ......... *H04L 43/0876* (2013.01); *H04W 4/008* (2013.01)

(58) Field of Classification Search
USPC ............... 701/29.1; 370/252; 340/426.15
See application file for complete search history.

(56) References Cited

U.S. PATENT DOCUMENTS

| | | | | |
|---|---|---|---|---|
| 2002/0147865 A1* | 10/2002 | Fujita | ...................... | G06F 13/28 710/22 |
| 2006/0261933 A1* | 11/2006 | Deniau | ................... | G07C 5/008 340/426.15 |
| 2008/0161989 A1* | 7/2008 | Breed | ...................... | B60J 10/00 701/31.4 |
| 2008/0319665 A1* | 12/2008 | Berkobin | ............... | G07C 5/085 701/469 |
| 2009/0019112 A1* | 1/2009 | Venner | ................ | H04L 12/1854 709/204 |
| 2012/0008509 A1* | 1/2012 | Myers | .................... | H04W 24/06 370/252 |
| 2013/0070860 A1* | 3/2013 | Schramm | .............. | H04J 3/0682 375/240.25 |
| 2013/0138800 A1* | 5/2013 | Gelter | .............. | H04N 21/64738 709/224 |
| 2013/0212659 A1* | 8/2013 | Maher | ..................... | H04L 63/06 726/6 |

(Continued)

*Primary Examiner* — Tyler Paige
(74) *Attorney, Agent, or Firm* — Christopher DeVries; Reising Ethington P.C.

(57) ABSTRACT

A mobile vehicle communication system and a method carried out by the system to determine at a remotely-located vehicle a performance criteria of a communication network connection in the vehicle. Steps of the method include: monitoring the vehicle's communication network connection for at least one of a plurality of parameters, wherein the plurality of parameters are associated with the performance criteria of the network connection; correlating a performance status test indicative of the performance criteria of the network connection with at least one of the plurality of parameters; and determining the performance criteria of the network connection based on the correlation.

20 Claims, 2 Drawing Sheets

(56) References Cited

U.S. PATENT DOCUMENTS

| | | | | |
|---|---|---|---|---|
| 2013/0282228 A1* | 10/2013 | Cawse | ............... | G07C 5/08 |
| | | | | 701/32.2 |
| 2014/0078889 A1* | 3/2014 | Diab | ............... | H04L 67/327 |
| | | | | 370/221 |
| 2014/0306833 A1* | 10/2014 | Ricci | ............ | B60Q 1/00 |
| | | | | 340/901 |

* cited by examiner

DETERMINING PERFORMANCE CRITERIA OF A VEHICLE COMMUNICATION NETWORK CONNECTION

TECHNICAL FIELD

The present invention relates to diagnosis of a communication network connection in a remotely-located vehicle.

BACKGROUND

When a vehicle system or device experiences an error or failure, the vehicle may generate and/or store a diagnostic trouble code (DTC). In telematics-equipped vehicles, the DTC may be transmitted cellularly to a backend or remotely located server; at times, this transmission is part of a vehicle data upload (VDU) that may occur during low or off-peak cellular-usage hours. The DTC reports one or more single incidents that have previously occurred. A vehicle user may be instructed using a vehicle message to bring the vehicle to a service center for further analysis and repair. However, at times, the source or cause of the DTC proves intermittent. And user frustration may ensue when an issue associated with the source or cause cannot be further diagnosed at the service center due to the intermittency.

DTCs do not pertain to monitoring or providing information regarding a status of the network connections that interconnect vehicle devices; instead, DTCs are generated by the vehicle devices themselves, or the electronic control unit(s) (ECUs) which couple the vehicle devices to the network connection(s). For example, DTCs do not report the health of an electronic data bus itself in the vehicle; rather, the vehicle devices (e.g., a GPS module, a tire-pressure monitoring device, etc.) typically use the data bus to report a failure or fault to another vehicle device (e.g., a diagnostics module). In fact, the process of reporting a DTC includes a presumption that the network connection is fully operational.

Thus, there is a need to monitor and determine the performance of the data bus itself. This is particularly true when streaming data is carried by the network connection. For example, where streaming video is being communicated over the network connection, video display quality may be reduced due to missing frames of data. And the reduced quality may result in user frustration. Further, the user may bring the vehicle to the service center only to discover that the reduction in display quality was temporary and intermittent and accordingly unidentifiable at the service center. This of course may result in additional user frustration and a lack of general satisfaction. Thus, there is a need to monitor and determine the performance of the data bus itself. In addition, there is a need to record sufficient data to later determine the root cause of any abnormalities thereby increasing customer satisfaction.

SUMMARY

According to an embodiment of the invention, there is provided a method of determining at a remotely-located vehicle a performance criteria of a communication network connection in the vehicle. The steps of the method include: monitoring the vehicle's communication network connection for at least one of a plurality of parameters, wherein the plurality of parameters are associated with the performance criteria of the network connection; correlating a performance status test indicative of the performance criteria of the network connection with at least one of the plurality of parameters; and determining the performance criteria of the network connection based on the correlation.

According to another embodiment of the invention, there is provided a method of determining at a remotely-located vehicle a performance criteria of a communication network connection in the vehicle. The steps of the method include: establishing a private communication link between a backend system and one of a vehicle telematics unit or a mobile device associated with the telematics unit; and receiving at the backend system a report generated by the telematics unit or the mobile device, wherein the generated report is based on performance criteria of the communication network connection which was previously determined at the remotely-located vehicle, wherein the performance criteria was determined by a vehicle system module (VSM) or the mobile device which correlated a status test associated with the performance criteria of the network connection with at least one of a plurality of monitored parameters and then determined the performance criteria based on the correlation.

According to another embodiment of the invention, there is provided a computer program product stored on a non-transitory computer readable medium in a mobile device that is configured to, when executed on the mobile device, determine a performance criteria of a communication network connection in a remotely-located vehicle. The determination of the performance criteria includes the steps of: establishing a short-range wireless communication (SRWC) link between the mobile device and a vehicle electronics device equipped with SRWC-capability; via the SRWC link, receiving at the mobile device at least one of a plurality of vehicle-monitored parameters associated with the performance criteria of the network connection; correlating at the mobile device a performance status test indicative of the performance criteria of the network connection with the at least one of the plurality of vehicle-monitored parameters; and at the mobile device, determining the performance criteria of the network connection based on the correlation.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENT(S)

The method described below pertains to determining a performance criteria of a communication network connection in a vehicle and determining this performance criteria remotely—e.g., performing the determination remotely includes determining the performance criteria at the vehicle away from (or distant from) a vehicle service center during typical or normal vehicle operation by a vehicle user, not when the vehicle is electrically coupled to vehicle diagnostic test equipment (such as at a vehicle service center). The determination includes remotely monitoring one or more network connection parameters that are associated with the performance criteria of the network connection, remotely correlating at least one network connection parameter with a performance status test that is indicative of at least some portion of the performance criteria, and then, in at least one embodiment, remotely making the determination based on the correlation. As will be described more below, the network connection can be any wired or wireless vehicle network connection (such as a data bus used by Ethernet or Audio-Visual Bridging (AVB))—such network connections can be used to couple various vehicle electronic devices or hardware modules to one another. And the remote determination of the performance criteria may occur using a computer program product stored on a vehicle electronic device or, in some instances, on a user's mobile device. In this manner, network connection itself may be monitored in real-time and network connection parameters may be correlated with one or more status tests during normal vehicle operation. Since the evaluation can be performed remotely, interruptions and issues in network connectivity and be determined even when the vehicle is not in for service (at the vehicle service center); and intermittent issues can be identified and recorded so that they may be addressed later by a service technician.

Communications System—

Figure 1:
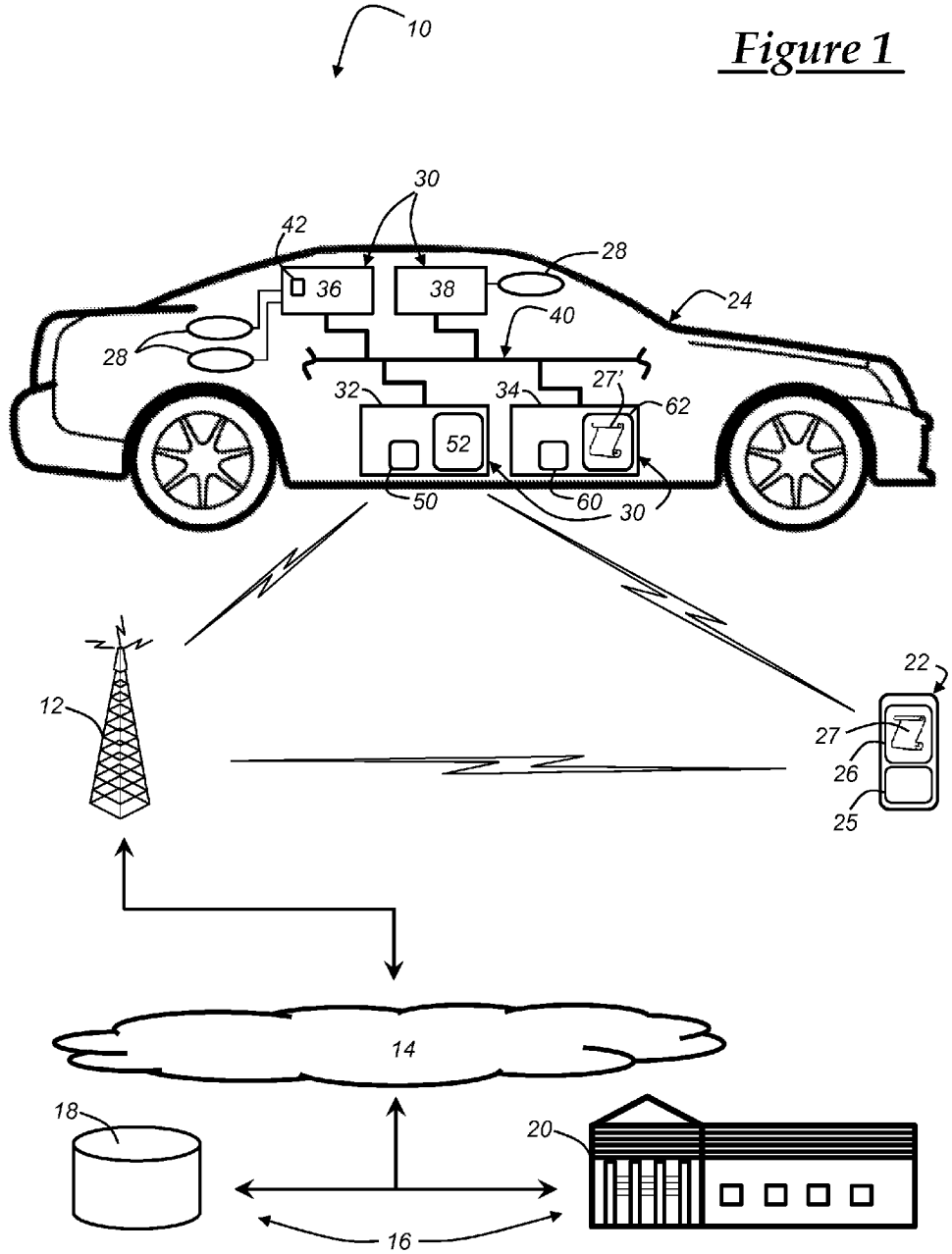
FIG. 1 is a block diagram depicting an embodiment of a communications system that is capable of utilizing the method disclosed herein.

With reference to FIG. 1, there is shown an operating environment that comprises a mobile vehicle communications system 10 and that can be used to implement the method disclosed herein. Communications system 10 generally includes: one or more wireless carrier systems 12; a land communications network 14; a backend system 16 that includes at least one of a remote server 18 or a data service center 20; a mobile device 22; and a vehicle 24. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 12 is preferably a cellular telephone system that includes a plurality of cell towers (only is one shown), one or more mobile switching centers (MSCs) (not shown), as well as any other networking components required to connect wireless carrier system 12 with land network 14. Each cell tower includes sending and receiving antennas and a base station, with the base stations from different cell towers being connected to the MSC either directly or via intermediary equipment such as a base station controller. Cellular system 12 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 12. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 12, a different wireless carrier system in the form of satellite communication can be used to provide uni-directional or bi-directional communication with the vehicle. This can be done using one or more communication satellites and an uplink transmitting station. Uni-directional communication can be, for example, satellite radio services, wherein programming content (news, music, etc.) is received by transmitting station, packaged for upload, and then sent to the satellite, which broadcasts the programming to subscribers. Bi-directional communication can be, for example, satellite telephony services using satellite to relay telephone communications between the vehicle 24 and uplink transmitting station. If used, this satellite telephony can be utilized either in addition to or in lieu of wireless carrier system 12.

Land network 14 may be a conventional land-based telecommunications network that is connected to one or more landline telephones and connects wireless carrier system 12 to backend system 16. For example, land network 14 may include a public switched telephone network (PSTN) such as that used to provide hardwired telephony, packet-switched data communications, and the Internet infrastructure. One or more segments of land network 14 could be implemented through the use of a standard wired network, a fiber or other optical network, a cable network, power lines, other wireless networks such as wireless local area networks (WLANs), or networks providing broadband wireless access (BWA), or any combination thereof. Furthermore, data service center 20 need not be connected via land network 14, but could include wireless telephony equipment so that it can communicate directly with a wireless network, such as wireless carrier system 12.

Remote server 18 can be one of a number of computers accessible via a private or public network such as the Internet. Each such server 18 can be used for one or more purposes, such as a web server accessible via land network 14 and/or wireless carrier 12. Other such accessible servers 18 can be, for example: a service center computer where diagnostic information and other vehicle data can be uploaded from the vehicle 24; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 24 or data service center 20, or both. Remote server 18 can also be used for providing Internet connectivity such as DNS services or as a network address server that uses DHCP or other suitable protocol to assign an IP address to the vehicle 24.

Data service center 20 is designed to provide the vehicle 24 with a number of different system back-end functions and generally includes one or more switches, servers, databases, live advisors, as well as an automated voice response system (VRS), all of which are known in the art. These various data service center components are preferably coupled to one another via a wired or wireless local area network. Switch, which can be a private branch exchange (PBX) switch, routes incoming signals so that voice transmissions are usually sent to either the live adviser by regular phone or to the automated voice response system using VoIP. The live advisor phone can also use VoIP; VoIP and other data communication through the switch may be implemented via a modem connected between the switch and network. Data transmissions are passed via the modem to server and/or database. Database can store account information such as subscriber authentication information, vehicle identifiers, profile records, behavioral patterns, and other pertinent subscriber information. Data transmissions may also be conducted by wireless systems, such as 802.11x, GPRS, and the like. Although one embodiment has been described as it would be used in conjunction with a manned data service center 20 using a live advisor, it will be appreciated that the data service center can instead utilize VRS as an automated advisor or, a combination of VRS and a live advisor can be used.

Mobile device 22 may be any electronic device capable of cellular voice and/or data calls across a wide geographic area where transmissions are facilitated by the wireless carrier system 12. It may be configured to provide cellular services according to a subscription agreement with a third-party facility such as a wireless service provider (WSP). In addition, mobile device 22 may be electronically coupled to the vehicle 24 by wire or wirelessly via short-range wireless communication (SRWC) (e.g., Wi-Fi Direct, Bluetooth, etc.).

Mobile device 22 includes a user interface coupled to a processor 25 configured to execute an operating system (OS) stored on mobile device memory 26 (e.g., on a non-transitory computer readable medium of the device). The processor 25 further may execute one or more software applications 27 stored in device memory as well. Using such applications, a vehicle user may remotely control or communicate with vehicle 24 or the backend system 16 (e.g., via cellular communication, SRWC, or both). For example, one application may enable the user to remotely lock/unlock vehicle doors, turn the vehicle on/off, check the vehicle tire pressures, fuel level, oil life, etc. According to one embodiment, application 27 may perform at least some of the method steps described herein—e.g., determining the performance criteria of a communication network connection in the vehicle 24. This will be described in greater detail below.

Non-limiting examples of the mobile device 22 include a cellular telephone, a personal digital assistant (PDA), a Smart phone, a personal laptop computer or tablet computer having two-way communication capabilities, a netbook computer, a notebook computer, or any suitable combinations thereof. The mobile device 22 may be used inside or outside of vehicle 24 by the vehicle user who may be a vehicle driver or passenger. It should be appreciated that the user does not need to have ownership of the mobile device 22 or the vehicle 24 (e.g., the vehicle user may be an owner or a licensee of either or both).

Vehicle 24 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Vehicle 24 may include electronics (some not shown) such as a microphone, one or more pushbuttons or other control inputs, a visual display, various vehicle sensors 28, and a number of vehicle system modules (VSMs) 30 such as a telematics unit 32, a vehicle multi-tainment unit (VMU) or head unit 34, an audio system 36, and a GPS module 38. Some of the electronics can be connected directly to the VSMs 30 such as, for example, the sensors 28, the microphone, and/or pushbutton(s), whereas others may be indirectly connected using one or more communication network connections 40.

Communication network connection 40 includes any wired or wireless intra-vehicle communications system for connecting or coupling the VSMs 30 and vehicle electronics to one another. According to one embodiment, the network connection 40 comprises a communications bus and/or an entertainment bus. Examples of suitable wired network connections include a controller area network (CAN), a media oriented system transfer (MOST), a local interconnection network (LIN), a local area network (LAN), and other appropriate connections such as Ethernet, Audio-Visual Bridging (AVB), or others that conform with known ISO, SAE and IEEE standards and specifications, to name but a few. In other embodiments, the network connection 40 may comprise any wireless intra-vehicle communication system such as a closed or secure Wi-Fi or Bluetooth connection.

Telematics unit 32 can be an OEM-installed (embedded) or aftermarket device that is installed in the vehicle and that enables wireless voice and/or data communication over wireless carrier system 12 and via wireless networking. This enables the vehicle 24 to communicate with data service center 20, other telematics-enabled vehicles (not shown), or some other entity or device (such as mobile device 22). The telematics unit preferably uses radio transmissions to establish a communications channel (a voice channel and/or a data channel) with wireless carrier system 12 so that voice and/or data transmissions can be sent and received over the channel. By providing both voice and data communication, telematics unit 32 enables the vehicle to offer a number of different services including those related to navigation, telephony, emergency assistance, diagnostics, infotainment, etc. Data can be sent either via a data connection, such as via packet data transmission over a data channel, or via a voice channel using techniques known in the art. For combined services that involve both voice communication (e.g., with a live advisor or voice response unit at the data service center 20) and data communication (e.g., to provide GPS location data or vehicle diagnostic data to the data service center 20), the system can utilize a single call over a voice channel and switch as needed between voice and data transmission over the voice channel, and this can be done using techniques known to those skilled in the art. Cellular communication using the telematics unit 32 may be carried out over the wireless carrier system 12 using a wireless service provider (WSP); and it should be appreciated that the WSP associated with the telematics unit 32 need not be the same WSP associated with the mobile device 22.

According to one embodiment, telematics unit 32 utilizes cellular communication according to either GSM, CDMA, or LTE standards and thus includes a standard cellular chipset for voice communications like hands-free calling, a wireless modem (not shown) for data transmission, an electronic processing device or processor 50, one or more digital memory devices 52, and a dual antenna (not shown). It should be appreciated that the modem can either be implemented through software that is stored in the telematics unit and is executed by processor 50, or it can be a separate hardware component located internal or external to telematics unit 32. The modem can operate using any number of different standards or protocols such as LTE, EVDO, CDMA, GPRS, and EDGE. Wireless networking between the vehicle and other networked devices can also be carried out using telematics unit 32. For this purpose, telematics unit 32 can be configured to communicate wirelessly according to one or more wireless protocols, including short range wireless communication (SRWC) such as any of the IEEE 802.11 protocols, WiMAX, ZigBee™, Wi-Fi direct, Bluetooth, or near field communication (NFC). When used for packet-switched data communication such as TCP/IP, the telematics unit 32 can be configured with a static IP address or can set up to automatically receive an assigned IP address from another device on the network such as a router or from a network address server.

Processor 50 can be any type of device capable of processing electronic instructions including microprocessors, microcontrollers, host processors, controllers, vehicle communication processors, and application specific integrated circuits (ASICs). It can be a dedicated processor used only for telematics unit 32 or can be shared with other vehicle systems. Processor 50 executes various types of digitally-stored instructions, such as software or firmware programs stored in memory 52, which enable the telematics unit to provide a wide variety of services. For instance, processor 50 can execute programs or process data to carry out at least a part of the method discussed herein.

The memory 52 may include computer usable or readable medium, which include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), and magnetic or optical disks or tapes. In at least one embodiment, memory 52 is a non-transitory computer readable medium.

Telematics unit 32 can be used to provide a diverse range of vehicle services that involve wireless communication to and/or from the vehicle. Such services include: turn-by-turn directions and other navigation-related services that are provided in conjunction with the GPS-based vehicle navigation module 38; airbag deployment notification and other emergency or roadside assistance-related services that are provided in connection with one or more collision sensor interface modules such as a body control module (not shown); diagnostic reporting using one or more diagnostic modules; and infotainment-related services where music, webpages, movies, television programs, videogames and/or other information is downloaded by an infotainment module (not shown) and is stored for current or later playback. The above-listed services are by no means an exhaustive list of all of the capabilities of telematics unit 32, but are simply an enumeration of some of the services that the telematics unit is capable of offering. Furthermore, it should be understood that at least some of the aforementioned modules could be implemented in the form of software instructions saved internal or external to telematics unit 32, they could be hardware components located internal or external to telematics unit 32, or they could be integrated and/or shared with each other or with other systems located throughout the vehicle, to cite but a few possibilities. In the event that the modules are implemented as VSMs 30 located external to telematics unit 32, they could utilize the network connection 40 (e.g., a vehicle bus) to exchange data and commands with the telematics unit.

GPS module 38 can receive radio signals from a constellation of GPS satellites. From these signals, the module 38 can determine vehicle position that is used for providing navigation and other position-related services to the vehicle driver. Navigation information can be presented on a vehicle display or can be presented verbally such as is done when supplying turn-by-turn navigation. The navigation services can be provided using a dedicated in-vehicle navigation module (which can be part of GPS module 38), or some or all navigation services can be done via telematics unit 32, wherein the position information is sent to a remote location for purposes of providing the vehicle with navigation maps, map annotations (points of interest, restaurants, etc.), route calculations, and the like. The position information can be supplied to data service center 20 or other remote computer system, such as computer 18, for other purposes, such as fleet management. Also, new or updated map data can be downloaded to the GPS module 38 from the data service center 20 via the telematics unit 32.

Audio system 36 may include or be coupled to a vehicle user interface and various electronics such as one or more microphones, pushbuttons, and displays. As used herein, the term 'vehicle user interface' broadly includes any suitable form of electronic device, including both hardware and software components, which is located on the vehicle and enables a vehicle user to communicate with or through a component of the vehicle. Microphone provides audio input to the telematics unit 32 to enable the driver or other occupant to provide voice commands and carry out hands-free calling via the wireless carrier system 12. For this purpose, it can be connected to an on-board automated voice processing unit utilizing human-machine interface (HMI) technology known in the art. The pushbutton(s) allow manual user input into the telematics unit 32 to initiate wireless telephone calls and provide other data, response, or control input. Separate pushbuttons can be used for initiating emergency calls versus regular service assistance calls to the data service center 20. Audio system 36 provides audio output to a vehicle occupant and can be a dedicated, stand-alone system or part of the primary vehicle audio system. According to the particular embodiment shown here, audio system 36 is operatively coupled to one or more network connections 40 (e.g., for purposes of communication, entertainment, and the like) and can provide AM, FM and satellite radio, CD, DVD and other multimedia functionality. This functionality can be provided in conjunction with or independent of the infotainment module described above. The visual display may be a graphics display, such as a touch screen on the instrument panel or a heads-up display reflected off of the windshield, and can be used to provide a multitude of input and output functions. The audio system 36 may comprise an external amplifier 42 as well; the amplifier 42 may receive and boost or amplify audio signals carried over the network connection 40.

Apart from the audio system 36 and GPS module 38, the vehicle 24 can include other vehicle system modules (VSMs) 30 in the form of electronic hardware components that are located throughout the vehicle and typically receive input from one or more sensors (e.g., such as sensors 28) and use the sensed input to perform diagnostic, monitoring, control, reporting and/or other functions. Each of the VSMs 30 is coupled by network connection 40 (e.g., a data bus) to the other VSMs, as well as to the telematics unit 32, and can be programmed to run vehicle system and subsystem diagnostic tests. As examples, other VSMs 30 may be an engine control module (ECM) that controls various aspects of engine operation such as fuel ignition and ignition timing, another VSM 30 can be a powertrain control module that regulates operation of one or more components of the vehicle powertrain, and another VSM 30 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle.

According to yet another embodiment, another VSM 30 includes head unit 34 which comprises a user interface for input/output (I/O) and a SRWC chipset (not shown), one or more processors or processing devices 60, and one or more memory devices 62—just to name a few components. In some embodiments, head unit 34 comprises part or all of the components of audio system 36; however, this is not required. Using the SRWC chipset, the head unit 34 may connect with portable devices such as mobile device 22 (e.g., using Wi-Fi, Wi-Fi Direct, Bluetooth, etc.). Additionally, the head unit 34 may operate as a Wi-Fi hotspot; e.g., the telematics unit 32 may establish a data call using the wireless carrier system 12, connect to the internet, and provide internet data to the head unit 34 via the network connection 40, which then serves as the hotspot for mobile device 22.

Embodiments of the one or more processors 60 and memory 62 (of the head unit 34) may be of similar type and may have similar characteristics and qualities as that of processor(s) 50 and memory 52, and therefore will not be explained in greater detail. For example, memory 62 also may be a non-transitory computer readable medium. However, it will be appreciated that processor 60 and memory 62 may be specially adapted to carry out the processes and methods associated with the head unit 34 (rather than the telematics unit 32). And again, in at least one embodiment, the processor(s) 60 and memory 62 may execute one or more steps of the method embodiments contemplated herein. For example, the method(s) may be performed as one or more computer programs executable by one or more computing devices of or in communication with the vehicle head unit 34 to cause the head unit and/or its respective computing device(s) to perform the method, and the various method related data may be stored in any suitable memory. The computer program may exist in a variety of forms both active and inactive. For example, the computer program can exist as software program(s) comprised of program instructions in source code, object code, executable code or other formats; firmware program(s); or hardware description language (HDL) files.

As is appreciated by those skilled in the art, the above-mentioned VSMs 30 are only examples of some of the modules that may be used in vehicle 24, as numerous others are also possible.

Method—

Figure 2:
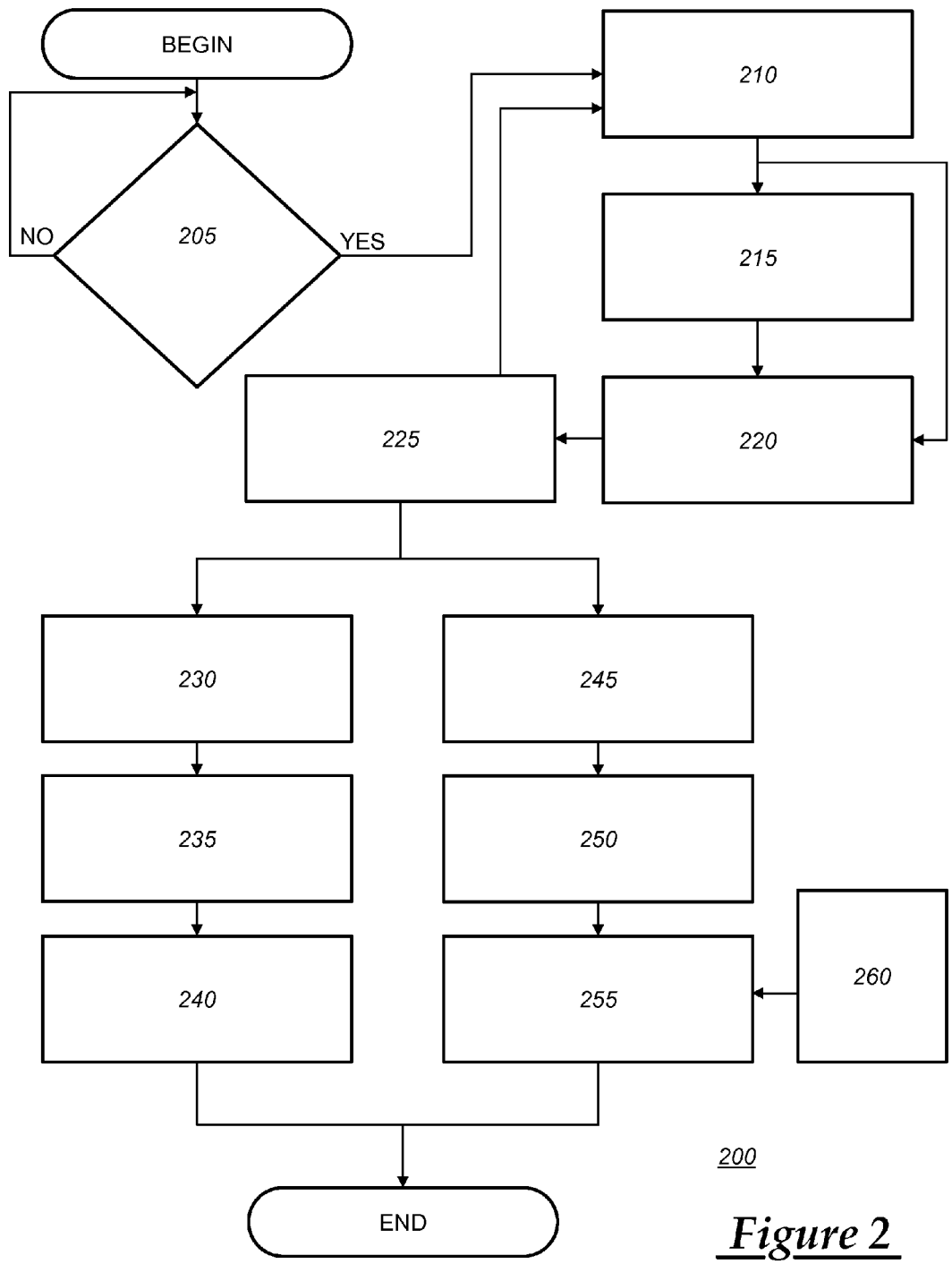
FIG. 2 is a flow diagram illustrating at least one method of determining a performance criteria of a communication network connection in a vehicle.

Turning now to FIG. 2, there is shown a flow diagram illustrating a method 200 of determining a performance criteria of the communication network connection 40 in the vehicle 24. The method begins at step 205 by determining whether the user of vehicle 24 consents to operation of at least a portion of method 200. During at least a portion of the method 200, continuous data may be recorded, monitored, and/or provided to one or more remotely-located facilities or destinations; e.g., such as backend system 16 or a vehicle service center having a service technician (not shown). The recorded/monitored data may be audio or video data, and monitoring/recording of such data may raise privacy concerns for some individuals if such monitoring/recording was to be performed without their consent. Thus, in step 205, the method petitions the user for such consent. If the consent is given, the method continues to step 210; however, if no consent is provided, in at least one embodiment, the method does not proceed without it. The method 200 loops back and awaits consent in step 205. The user may provide consent via a manual or tactile entry at the vehicle 24; or the user may provide consent in other ways, e.g., via manual entry at a web-based computer portal (not shown), via a voice or data call with the data service center 20 (e.g., using telematics unit 32 or mobile device 22), or using application software stored on and executable using the mobile device 22, just to name a few examples.

When the method 200 proceeds to step 210, one of the VSMs 30 monitors the communication network connection 40. For purposes of illustration only, the afore-going describes the head unit 34 as this VSM 30; however, it should be appreciated that any other suitable VSM 30 may monitor the network connection 40 (e.g., such as the telematics unit 32). Thus, in step 210, the head unit 34 monitors one or more network connection parameters associated with the performance criteria. The performance criteria includes any standard or measurement indicative of the partial or overall health of the network connection 40. Thus, the performance criteria may be entirely operational, entirely un-operational, or any degree of operability therebetween. In addition, the performance criteria may be for a range of time or for a momentary instant in time; e.g., at a time $t_0$, the performance criteria may be fully operational, at a time $t_1$, the performance criteria may have only some degree of operability (i.e., be partially degraded), and at a time $t_2$, the performance criteria again may be fully operational.

The network connection parameters monitored by head unit 34 may include any suitable values indicative or useful in determining whether the network connection is operating properly or as expected. Non-limiting examples of network connection parameters include network identifiers (e.g., an internet protocol (IP) address), a network connection speed (e.g., a link speed), any network transfer or transmission statistics (e.g., including any one or more of a quantity of sent data packets, received data packets, send errors, receive errors, packet collisions, etc.), and/or any suitable electrical signal value(s) such as a signal-to-noise or SNR value, an active or inactive status indicator, a ready or stand-by indicator, a pass or fail indicator, etc. These of course are merely examples, and other examples also exist.

According to at least one embodiment of step 210, the head unit 34 monitors, among other things, network transfer or transmission statistics associated with audio and/or video streaming data over an Ethernet-type network connection 40. In another embodiment, the head unit 34 monitors network transfer or transmission statistics associated with audio and/or video streaming data over an AVB-type network connection 40. Regardless of the type of network connection, the head unit 34 monitors these and/or other such parameters in step 210 and thereafter the method proceeds to step 215.

In step 215, the head unit 34 may store the monitored network connection parameters in head unit memory 62. The stored parameters later may be used to determine the performance criteria of the network connection 40. The head unit 34 may store any or all parameters therein. The storage of any of the parameters may be continuous or may occur intermittently. In at least one embodiment (and as will be further illustrated below), the head unit may store any or all parameters associated with a degradation in performance criteria. In some implementations, step 215 may be bypassed as shown in FIG. 2. For example, no parameters may be stored in step 215, or at least, no parameters may be stored at this juncture of method 200. Following step 215, the method proceeds to step 220.

In step 220, the head unit 34 correlates one or more of the monitored network connection parameters with at least one performance status test. The status test(s) may be any suitable test or validation that uses the network connection parameter(s) to determine the performance criteria. For example, the correlating step may determine the type of network connection based on the network connection parameter being monitored. For example, the some status tests may be uniquely associated with an Ethernet-type network connection, an AVB-type network connection, or the like. Following step 220, the method proceeds to step 225.

In step 225, the head unit 34 determines a network connection performance criteria using the correlated status test and the monitored network connection parameter(s). For example, one status test may compare whether a monitored parameter falls above, below, or equal to a predetermined threshold of the status test. In one example, the status test compares the monitored parameter to a correlated threshold; e.g., a network connection link speed parameter may be compared to a predetermined network connection link speed threshold. When the status test determines that the monitored link speed parameter exceeds the threshold, then at least that portion of the performance criteria is determined to be healthy or un-degraded. However, if the monitored link speed parameter is less than the same threshold, then at least that portion of the performance criteria is at least partially unhealthy or degraded. This type of analysis may be performed for many different monitored parameters using appropriately correlated status test(s).

In another example, a monitored transfer statistic parameter may be compared to a predetermined network connection transfer statistic threshold. The threshold could include a predetermined sent-packet threshold and/or a predetermined received-packet threshold. When this status test determines that the monitored transfer statistic parameter is less than the sent-packet threshold (or the parameter is less than the received-packet threshold), then at least that portion of the performance criteria is determined to be healthy or un-degraded. However, if the monitored transfer statistic parameter is equal to or approximates the threshold, then at least that portion of the performance criteria is at least partially unhealthy or degraded.

Similarly, in yet another example, the monitored transfer statistic parameter may be a collision packet parameter and the status test may be a comparison of the parameter to a predetermined packet-collision threshold. When this status test determines that the monitored parameter exceeds the packet-collision threshold, then at least that portion of the performance criteria is determined to be healthy or un-degraded.

Hereafter follows a non-limiting listing of other examples of network connection parameters and correlated status tests used to determine performance criteria in step 225—an Ethernet network connection status test (parameters including: verifying an internet protocol (IP) address, comparing link speed (Mbit/s) to a threshold, determining link status (e.g., whether active/inactive); an AVB network connection status test (parameters including: determining link status (e.g., whether active/inactive), determining a stream status), determining network synchronization (e.g., pass or fail), determining whether a media clock is locked (e.g., to grand master) (e.g., pass or fail); an AVB or Ethernet network port status test (e.g., on a switch or a leaf node) (parameters including: determining whether active, inactive, ready, etc.); an AVB or Ethernet frame status test (parameters including pass or fail, depending on whether frames are successfully transmitted over communication network 40); an AVB or Ethernet signal quality status test (parameters including whether signal-to-noise (SNR) exceeds a predetermined threshold suitable for the communication network 40); an AVB or Ethernet network switch status test (parameters including pass or fail, depending on whether a self-switch test was successful over communication network 40); an AVB or Ethernet network topology status test (parameters including pass or fail, depending on whether topology of communication network is equal to expected topology; e.g., desired topology matches current topology); an AVB or Ethernet network active service verification status test (parameters including whether active services over the communication network 40 are actually being provided, e.g., within expected values/rates/etc.; this may include pass or fail, or as discussed below, transfer statistic may be compared to various thresholds); and an AVB stream status test (parameters including pass or fail, depending on whether actual AVB streams match AVB streaming map). With regard to the AVB or Ethernet network active service verification status test, Ethernet transfer statistics include sent packets, received packets, send errors, receive errors, and collisions. And AVB transfer statistics include percentage of bandwidth consumed by transmitted signals, percentage of bandwidth consumed by received signals, etc. In each of these status tests, only some of parameters may be used with each status test, or the status tests also may include all of the listed parameters or other parameters not listed above. Further, the listing of status tests is not intended to be limiting either but rather is provided by way of example. Other status tests are contemplated.

In all these examples associated with step 225, the determination of the performance criteria may be continuous, momentary, periodic, etc. For example, while not illustrated, the performance criteria could be graphically illustrated plotting performance criteria versus time (e.g., y-axis being a magnitude or measure of performance criteria and x-axis being a measure of time). The plot could illustrate general or overall performance criteria or the performance criteria with respect to one or more monitored parameters. Of course, when stored at vehicle 24, a graphical depiction (not shown) could illustrate a temporarily undesirable performance criteria which could be undetectable when the vehicle 24 is later at a vehicle service center. For example, if a high rate of packet collisions are occurring during normal vehicle use but then the collisions cease before the vehicle is located at the service center, a service technician may have difficulty identifying the source of the fault, labeling the issue as intermittent, however, failing to resolve the customer concern or improve customer satisfaction.

Thus, in at least one embodiment, the method 200 proceeds to step 230 following step 225. In step 230, the performance criteria, or some representation of it, is stored in memory 62 at least until the criteria can be reported. Thereafter, the method proceeds to step 235.

In step 235, the vehicle 24 is located at a vehicle service center; e.g., the user may drive the vehicle to the service center. In one embodiment, as a result of the determination in step 225, the user may receive a notification to take vehicle 24 to the service center. Notification types vary and any suitable notification may be used (e.g., audio, visual, haptic, etc.). Following step 235, the method proceeds to step 240.

In step 240, the performance criteria stored in step 230 is retrieved by a service technician at the service center. In at least one implementation, the performance criteria is provided as a report; however, raw performance criteria information also could be provided (as well as raw parameter data). Using such information, the technician may diagnose the fault which caused a degradation in performance of the network connection 40. And thereafter, the method 200 ends.

Following step 225, the method 200 alternatively or also could proceed to step 245. In step 245, a report is generated and remotely provided to the backend system 16. In one example, the report may be provided via the network connection 40 from the head unit 34 to the telematics unit 32. Thereafter, the telematics unit may transmit cellularly the report to the backend system 16 via the wireless carrier system 12 and/or the land network 14. Or in another example, the head unit 34 may provide the report to the mobile device 22. This may occur via SRWC—e.g., direct wireless communication between the head unit 34 and the mobile device, or the head unit 34 may provide the report to the telematics unit 32 which in turn provides it to the mobile device 22 (e.g., also via SRWC). Once the mobile device 22 receives the report, it may provide the report to the backend system 16 via the land network 14, the wireless carrier system 12, or both.

In at least one embodiment, the report ultimately is transmitted to the backend system 16 via a private communication link (e.g., using a private access point name or APN that is previously known to the telematics unit 32, the mobile device 22, or both). The method 200 may then proceed to step 250.

In step 250, the backend system 16 may determine the cause of any undesirable performance criteria using the report. This may occur as a result of a single report or multiple reports from vehicle 24. The determination made by the backend system 16 may be similar to a determination which could also be made by a service technician. After step 250, the method proceeds to step 255.

In step 255, the performance criteria of the report may be stored by the backend system 16 (e.g., in server 18 or at data service center 20 as well as a vehicle identifier such as a vehicle identification number (VIN) or a mobile station identification (MSID) associated with the telematics unit 32). Storing such information may be useful in determining, e.g., ongoing or future wireless carrier system 12 or WSP issues or degradations.

In addition in step 260, other vehicles which are associated with the backend system 16 may provide similar reports thereto. Collectively, a number of vehicle reports may identify undesirable performance criteria for a number of vehicles based on a geographic area, based on a wireless service provider, etc. This collective information can be used to improve backend or telematics service thereby improving the overall experience of many vehicle users associated with the backend system 16. Thereafter, the method 200 ends.

Other embodiments of the method 200 also are contemplated. For example, sensor data of vehicle 24 may be collected and correlated to the monitored parameter(s). In one example, GPS sensor data may be provided in the report provided to the vehicle service center (in step 240) or to the backend system 16 (in step 245). Using such sensor data, issues associated with the wireless carrier system 12 or WSP may be more readily identified. For example, electro-magnetic interference (EMI) may be unsuitably strong within an area traversed by vehicle 24; and when the vehicle passes nearby, the EMI may cause undesirable performance criteria of network connection 40; this may be exhibited to the vehicle user as audio or video interruptions (e.g., due to loss of transmitted packet data). Such anomalies would not be detectable by a service technician at a later time—e.g., where the service center is not within range of or affected by the EMI source. However, by correlating this additional sensor data and reporting it with the performance criteria, a root cause of the audio and/or video interruptions may be determined.

In yet other embodiments, step 215 may occur at any suitable time during method 200. For example, once an undesirable performance criteria is determined, the monitored parameters associated therewith may be stored.

Also, in another embodiment, at least some of the method steps may be performed by the mobile device 22. For example, FIG. 2 illustrates method 200 being carried out by software 27' stored in head unit memory 62. For example, the software instructions therein are executable by the processor 60 to monitor the parameters, store the parameters, correlate the status test to the parameters, and determine the performance criteria—just to name a few examples. Some of these steps may be carried out by software 27 stored on mobile device memory 26 and executable by mobile device processor 25. For example, steps 215, 220, 225, 230, and/or 245 may all be performed on mobile device 22. The mobile device 22 and VSM 30 (e.g., the telematics unit 32 or head unit 34) may establish SRWC—e.g., a secure or encrypted wireless connection. The VSM 30 may monitor the network connection parameters in step 210 and provide this monitored data to the device 22 via the SRWC connection. After which (or during the monitoring), the mobile device may execute steps 215, 220, and/or 225. Having determined the performance criteria in step 225, the mobile device may store it (step 230) and even make it available to a service technician (in step 240). Or following step 225, the mobile device 22 may generate and provide a report to the backend system 16 (in step 245). Of course, the mobile device 22 may include other VSM data (e.g., sensor data) in the report as well. In any case, the mobile device 22 and executable software instructions stored thereon may enable the determination of performance criteria during normal vehicle use (i.e., while not having to be connected to special diagnostics equipment at a vehicle service center).

Thus, there has been described a method of determining performance criteria of a network connection in a vehicle. While the network connection may be a data bus (e.g., using Ethernet or AVB), the network connection is not limited to wired connections. Determination of the performance criteria includes monitoring network connection parameters, correlating a status test to these parameters, and determining network connection performance criteria based on the monitoring and the correlated status test. The method may be used to identify issues that arise with the network connection itself and while the vehicle is in normal use (i.e., not hooked up to a diagnostic test machine). The disclosed method enables service personnel to later identify network connection issues, including related intermittent issues.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of determining at a vehicle a performance criteria of a communication network connection in the vehicle, comprising the steps of:

monitoring at a vehicle system module (VSM) the vehicle's intravehicular Ethernet network connection for at least one of a plurality of network connection parameters, wherein the plurality of network connection parameters are associated with the performance criteria of the intravehicular Ethernet network connection;

correlating at the VSM, at a mobile device located proximate to the vehicle, or both a performance status test indicative of the performance criteria of the intravehicular Ethernet network connection with at least one of the plurality of network connection parameters; and determining at the VSM, at the mobile device, or both the performance criteria of the intravehicular Ethernet network connection based on the correlation, wherein the vehicle's intravehicular Ethernet network connection includes a wired or wireless intra-vehicle communication system for connecting a plurality of VSMs to one another.

2. The method of claim 1, wherein the monitoring step continues while the determining step occurs.

3. The method of claim 2, wherein the determining step occurs repeatedly.

4. The method of claim 1, wherein the remotely-located vehicle is remotely-located from a vehicle service center during the monitoring step.

5. The method of claim 4, wherein the correlating and determining steps are performed remotely from the vehicle service center.

6. The method of claim 1, wherein the intravehicular Ethernet network connection includes an Audio Visual Bridging (AVB) network connection.

7. The method of claim 6, wherein the plurality of VSMs include a vehicle telematics unit and a vehicle head unit.

8. The method of claim 6, wherein the performance status test includes one of an Ethernet network connection status test, an AVB network connection status test, an AVB or Ethernet network port status test, an AVB or Ethernet frame status test, an AVB or Ethernet signal quality status test, an AVB or Ethernet network switch status test, an AVB or Ethernet network topology status test, an AVB or Ethernet network active service verification status test, or an AVB stream status test.

9. The method of claim 1, wherein the VSM is one of a head unit in the vehicle or a telematics unit in the vehicle.

10. The method of claim 9, wherein each of the telematics unit and the mobile device have a private communication link with a backend system associated with a data service center.

11. The method of claim 9, further comprising: storing, at least temporarily, at least one of the plurality of network connection parameters in memory of the vehicle head unit, in memory of the telematics unit, or in memory of the mobile device; and then using the at least one stored parameter in the determining step.

12. The method of claim 9, further comprising: generating a report based on the determined performance criteria; and transmitting the report to a backend system from the telematics unit or from the mobile device.

13. The method of claim 12, wherein the report further comprises vehicle system module (VSM) data.

14. A method of determining at a remotely-located vehicle a performance criteria of an intravehicular Ethernet network connection in the vehicle, comprising the steps of:

establishing a private communication link between a backend system and one of a vehicle telematics unit or a mobile device associated with the telematics unit; and receiving at the backend system a report generated by the telematics unit or the mobile device, wherein the generated report is based on performance criteria of the intravehicular Ethernet network connection which was previously determined at the remotely-located vehicle, wherein the performance criteria was determined by a vehicle system module (VSM) or the mobile device which correlated a status test associated with the performance criteria of the intravehicular Ethernet network connection with at least one of a plurality of monitored parameters and then determined the performance criteria based on the correlation, wherein the intravehicular Ethernet network connection in the remotely-located vehicle includes a wired or wireless intra-vehicle communication system for connecting a plurality of VSMs to one another.

15. The method of claim 14, wherein the VSM which determined the performance criteria includes one of the vehicle telematics unit or a vehicle head unit.

16. The method of claim 14, wherein the determined performance criteria occurs while the vehicle was not electrically coupled to vehicle diagnostics equipment associated with a vehicle service center.

17. The method of claim 14, wherein the status test includes one of an Ethernet network connection status test, an AVB network connection status test, an AVB or Ethernet network port status test, an AVB or Ethernet frame status test, an AVB or Ethernet signal quality status test, an AVB or Ethernet network switch status test, an AVB or Ethernet network topology status test, an AVB or Ethernet network active service verification status test, or an AVB stream status test.

18. The method of claim 14, further comprising receiving reports at the backend system from a plurality of other vehicles; and based on the reports, identifying at the backend system an issue associated with a wireless carrier system or a wireless service provider.

19. A computer program product stored on a non-transitory computer readable medium in a mobile device that is configured to, when executed on the mobile device, determine a performance criteria of an intravehicular Ethernet network connection in a remotely-located vehicle, wherein the intravehicular Ethernet network connection in the vehicle includes a wired or wireless intra-vehicle communication system for connecting a plurality of vehicle system modules (VSMs) to one another, wherein the determination of the performance criteria comprises the steps of:

establishing a short-range wireless communication (SRWC) link between the mobile device and a vehicle electronics device equipped with SRWC-capability;

via the SRWC link, receiving at the mobile device at least one of a plurality of vehicle-monitored parameters associated with the performance criteria of the intravehicular Ethernet network connection;

correlating at the mobile device a performance status test indicative of the performance criteria of the intravehicular Ethernet network connection with the at least one of the plurality of vehicle-monitored parameters; and at the mobile device, determining the performance criteria of the intravehicular Ethernet network connection based on the correlation.

20. The computer program product of claim 19, wherein the determination of the performance criteria further comprises:

at the mobile device, generating a report based on the determined performance criteria; and transmitting the report from the mobile device to a backend system associated with the vehicle, wherein the vehicle is remotely-located with respect to the backend system.

* * * * *